UNITED STATES PATENT OFFICE.

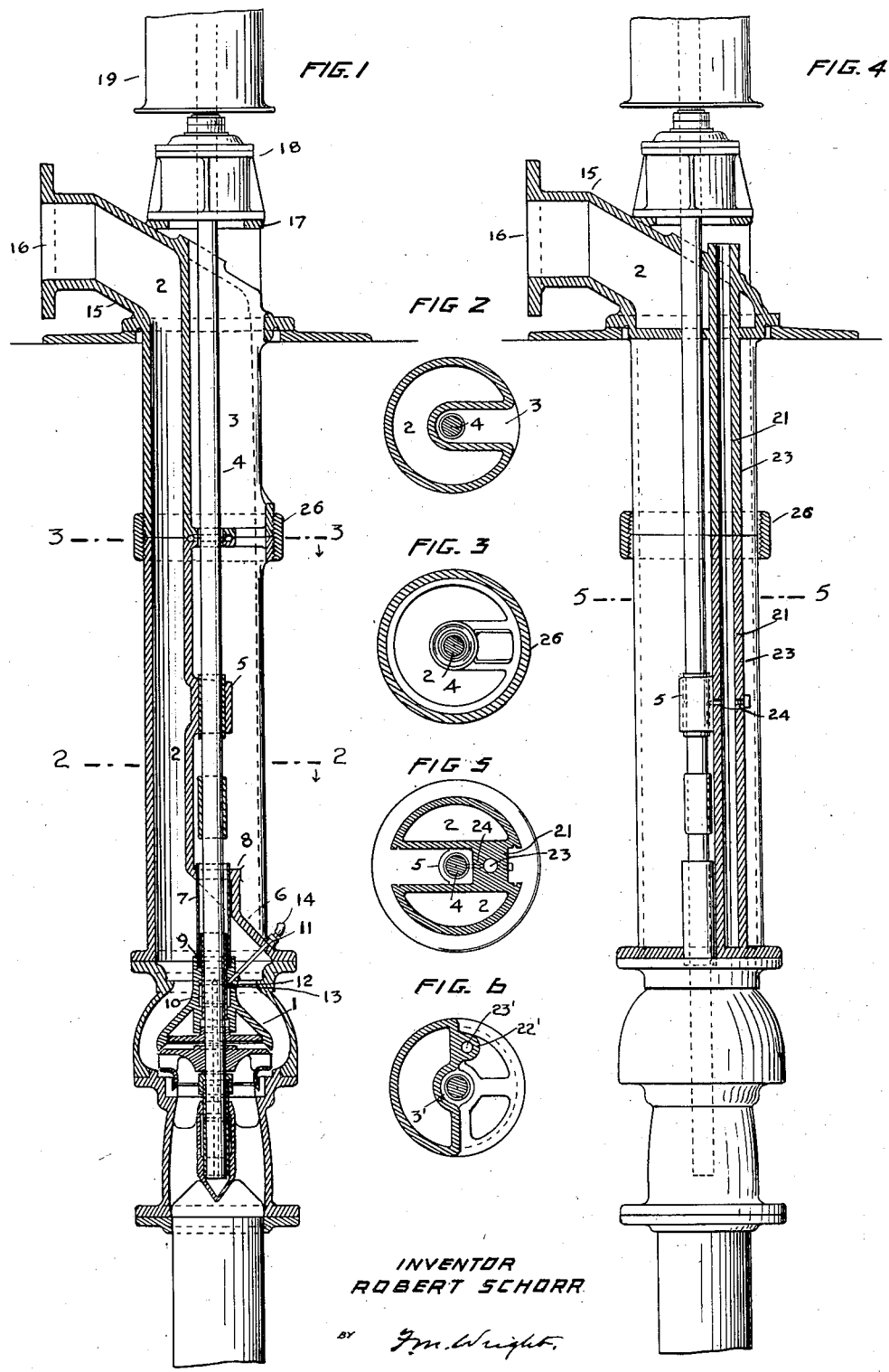

ROBERT SCHORR, OF SAN FRANCISCO, CALIFORNIA, ASSIGNOR TO BYRON JACKSON IRON WORKS, OF WEST BERKELEY, CALIFORNIA, A CORPORATION OF CALIFORNIA.

DISCHARGE-COLUMN FOR ROTARY PUMPS.

1,250,519.     Specification of Letters Patent.     Patented Dec. 18, 1917.

Application filed November 7, 1916. Serial No. 129,943.

*To all whom it may concern:*

Be it known that I, ROBERT SCHORR, a citizen of the United States, residing at San Francisco, in the county of San Francisco and State of California, have invented new and useful Improvements in Discharge-Columns for Rotary Pumps, of which the following is a specification.

To protect the bearings for vertical driving shafts of deep well rotary pumps from grit which is often carried in the discharge water, it has been customary to surround the shaft and bearings by an inner protecting tube, concentric with the outer discharge casing. Such an arrangement requires very accurate workmanship and careful assembling of the parts to insure the correct alinement of the bearings. Also with this construction leakage at the joints is very apt to develop in the course of time and water will thus obtain access to the bearings.

Other designs provide for two or more individual discharge pipes with a vertical shaft between them and bearings for the shaft mounted on the outside of one or more of the discharge pipes. This arrangement likewise involves great care and skill in assembling, and it has also the disadvantage of sacrificing a large part of the available well-cross-section for structural members, thus restricting the effective area of the water discharge conduit.

The object of the present invention is to provide a discharge column for such pumps which will avoid the above objections, which will be of simple and rigid construction, in which correct alinement of the bearings will be insured with the proper machining of the column joint, in which no stuffing boxes are required, and which will be open to inspection before the column is lowered into the well.

In the accompanying drawing, Figure 1 is a central vertical section of my improved discharge column; Figs. 2 and 3 are cross-sections thereof on the lines 2—2 and 3—3 respectively; Fig. 4 is a view similar to Fig. 1 of a modification of the invention; Fig. 5 is a cross-section on the line 5—5 of Fig. 4; Fig. 6 is a cross-section of a further modification.

Referring to the drawing, 1 indicates a centrifugal or rotary pump, discharging the water through a discharge column 2.

In the form of my invention shown in Figs. 1, 2 and 3, the sections of my improved discharge column are cylindrical, but have longitudinally extending indentations or grooves 3 sufficiently deep to extend around the axes of the cylinder sections and form pockets for the accommodation of the driving shaft 4 extending along said axes and bearings 5 for said shaft.

The water conduit of the lowermost section of the discharge column expands downwardly, as shown at 6, and at the bottom corresponds in form to the top of the discharge chamber of the pump. A pipe 7 around the driving shaft 4 is screwed through a circular threaded opening in an extension 8 of said lower portion 6 of the lowermost section, and its lower end fits tightly within the upper end of the inner part 9 of the pump casing, so as to establish an outlet for leakage of water which may pass through the pump bearings 10.

For lubricating the pump bearings a pipe 11 is screwed through a hole in the flaring portion 6 of the lower section of the discharge column, and has a nozzle 12 entering the outer end of a conduit 13 leading to said bearing. This pipe is connected on the outside of the discharge column to a pipe 14 leading from the top of the column.

The upper end of the uppermost column section is connected to the discharge casting 15, having a discharge opening 16 and a seat 17 for bearings 18 for supporting the upper end of the driving shaft. In Fig. 1 a pulley 19 connected to the driving shaft is shown, but the belt drive can be displaced by direct motor connection or otherwise.

The form of the invention shown in Figs. 1, 2 and 3 is suitable for discharge columns of large capacity.

In the form of the invention shown in Figs. 4 and 5, each section of the discharge column is in two parts having longitudinal webs 21 extending their full length. There extend therethrough vertical oil passages 23, which have lateral passages 24 leading therefrom to said bearings 5.

In the form of the invention shown in Figs. 5 and 6 the discharge column sections are semi-cylindrical in form, having axial grooves 3' to receive the driving shaft and having webs 22' having vertical oil passages 23'.

Both of these latter forms of the invention are suitable for discharge columns of small capacity.

In all cases the discharge column sections have ends in the form of complete cylinders, and the ends of adjacent sections are connected together by threaded sleeves 26 screwed upon said ends.

I claim:—

1. In a rotary deep well pump, the combination with a discharge column constructed with an exterior recess, the wall of which separates it from the discharged water, of a vertical driving shaft, and bearings for said shaft located in said recess.

2. In a rotary deep well pump, the combination with a discharge column constructed with an exterior recess, the wall of which separates it from the discharged water, of a vertical driving shaft, and bearings for said shaft located in said recess, said discharge column having integral therewith a channel communicating with the bearings for the purpose of forcing lubricant thereto.

ROBERT SCHORR.